(12) United States Patent
Yamada

(10) Patent No.: US 9,031,139 B2
(45) Date of Patent: May 12, 2015

(54) COMMUNICATION APPARATUS, SIGNAL SUPERIMPOSING CIRCUIT, AND METHOD FOR SUPERIMPOSING SIGNALS

(75) Inventor: Shigeo Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/239,135

(22) PCT Filed: Jul. 5, 2012

(86) PCT No.: PCT/JP2012/004372
§ 371 (c)(1),
(2), (4) Date: Feb. 15, 2014

(87) PCT Pub. No.: WO2013/027322
PCT Pub. Date: Feb. 28, 2013

(65) Prior Publication Data
US 2014/0205027 A1    Jul. 24, 2014

(30) Foreign Application Priority Data

Aug. 23, 2011    (JP) .................................. 2011-181854

(51) Int. Cl.
*H04B 3/00*    (2006.01)
*H04B 3/04*    (2006.01)
*H04L 25/02*    (2006.01)

(52) U.S. Cl.
CPC .............. *H04B 3/04* (2013.01); *H04L 25/0272* (2013.01)

(58) Field of Classification Search
CPC .. H01B 11/20; H01B 11/183; H01B 11/1834; H01B 11/18; H01B 11/00; H01B 11/1826; H01B 11/1869; H01B 13/00; H01B 13/0841; H04N 21/4305; H04N 21/43615; H04N 21/43635; H04N 21/4402; H04N 7/14; H03F 3/4508; H03F 3/68; H04B 3/04; H04L 25/0272

USPC ......... 375/219, 222, 230, 257, 259, 270, 285, 375/286, 295, 299, 306, 316, 319, 320, 322, 375/328, 331, 340
See application file for complete search history.

(56) References Cited

U.S. PATENT DOCUMENTS 6,781,465 B1 *   8/2004   Berzins et al. ................ 330/258
8,891,595 B1 *  11/2014   Farjadrad et al. ............. 375/219
(Continued)

FOREIGN PATENT DOCUMENTS

JP    08-331169 A     12/1996
JP    2002-204272 A    7/2002
(Continued)

OTHER PUBLICATIONS

Extended European Search Report dated Mar. 20, 2015 (English Version).
(Continued)

*Primary Examiner* — Hirdepal Singh
(74) *Attorney, Agent, or Firm* — McGinn IP Law Group, PLLC

(57) ABSTRACT

A communication apparatus according to the present invention comprises first communication means configured to transmit differential signals serving as first information over a first wire pair; second communication means configured to transmit differential signals serving as second information over a second wire pair; and third communication means configured to transmit third information by transmitting one of differential signals over the first wire pair and transmitting the other of the differential signals over the second wire pair. It is possible to provide a communication apparatus that spurious emission is suppressed.

14 Claims, 12 Drawing Sheets

(56) References Cited

U.S. PATENT DOCUMENTS

| | | | |
|---|---|---|---|
| 2004/0239374 A1* | 12/2004 | Hori | 327/65 |
| 2006/0013331 A1 | 1/2006 | Choi et al. | |
| 2009/0003464 A1* | 1/2009 | Matsubara et al. | 375/257 |
| 2009/0086765 A1* | 4/2009 | Taguchi | 370/503 |
| 2010/0120383 A1* | 5/2010 | Kikuchi et al. | 455/114.2 |
| 2010/0272215 A1* | 10/2010 | Lin et al. | 375/316 |
| 2011/0293041 A1* | 12/2011 | Luo et al. | 375/316 |
| 2013/0223293 A1* | 8/2013 | Jones et al. | 370/276 |
| 2013/0243106 A1* | 9/2013 | Toba et al. | 375/257 |
| 2014/0073243 A1* | 3/2014 | Hijioka et al. | 455/41.1 |

FOREIGN PATENT DOCUMENTS

| | | |
|---|---|---|
| JP | 2004-356714 A | 12/2004 |
| JP | 2008-521342 A | 6/2008 |
| WO | WO 2009/058790 A1 | 5/2009 |

OTHER PUBLICATIONS

Gabara T: "Phantom Mode Signaling in VLSI Systems", Advanced Research in VLSI, 2001. ARVLSI 2001. Proceedings. 2001 Conference on Mar. 14-16, 2001, Piscataway, NJ, USA, IEEE.

* cited by examiner

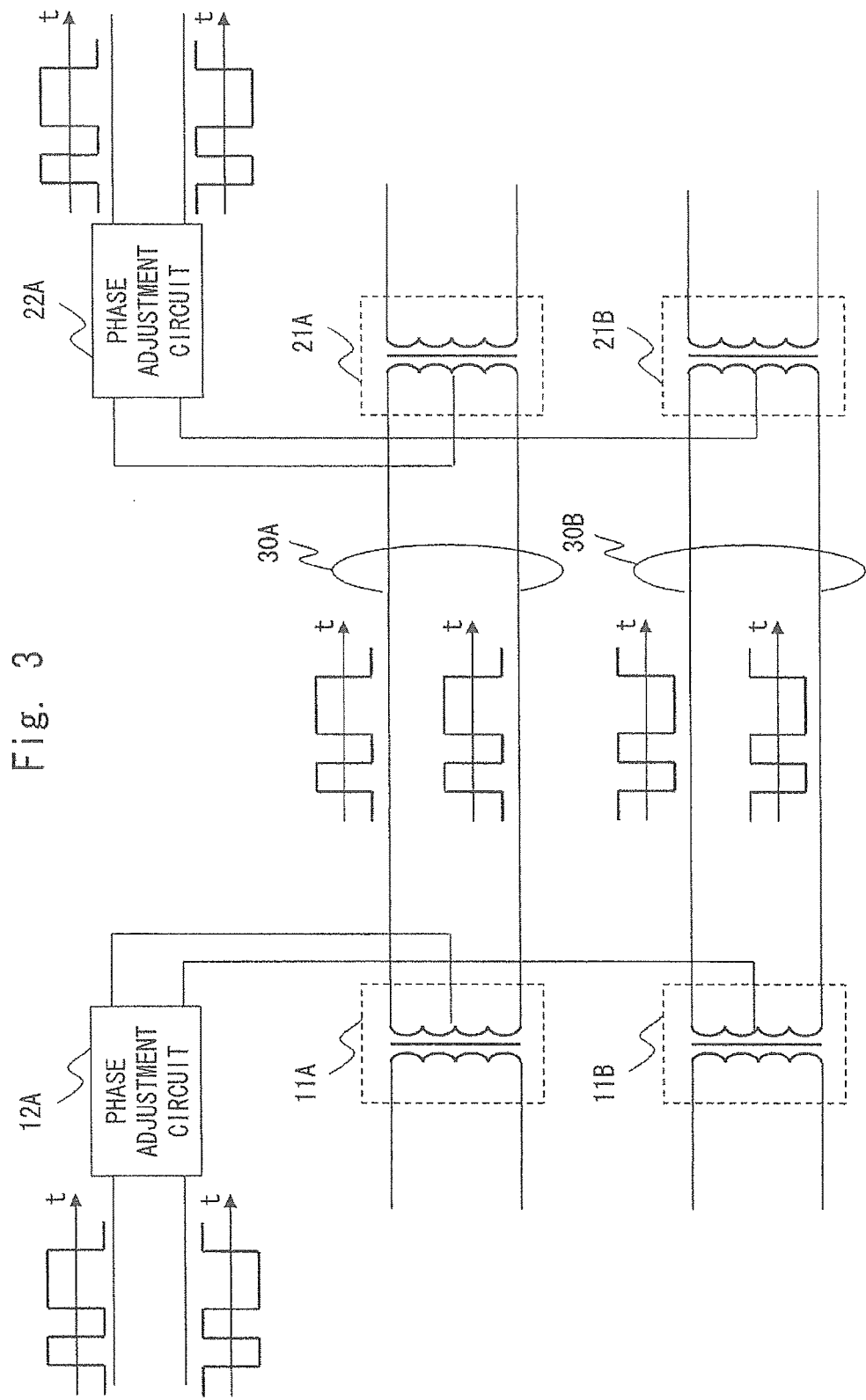

TWISTED PAIR CABLE 30A

TWISTED PAIR CABLE 30B

OUTPUTS FROM SUPERIMPOSING COIL 21A

OUTPUTS FROM SUPERIMPOSING COIL 21B

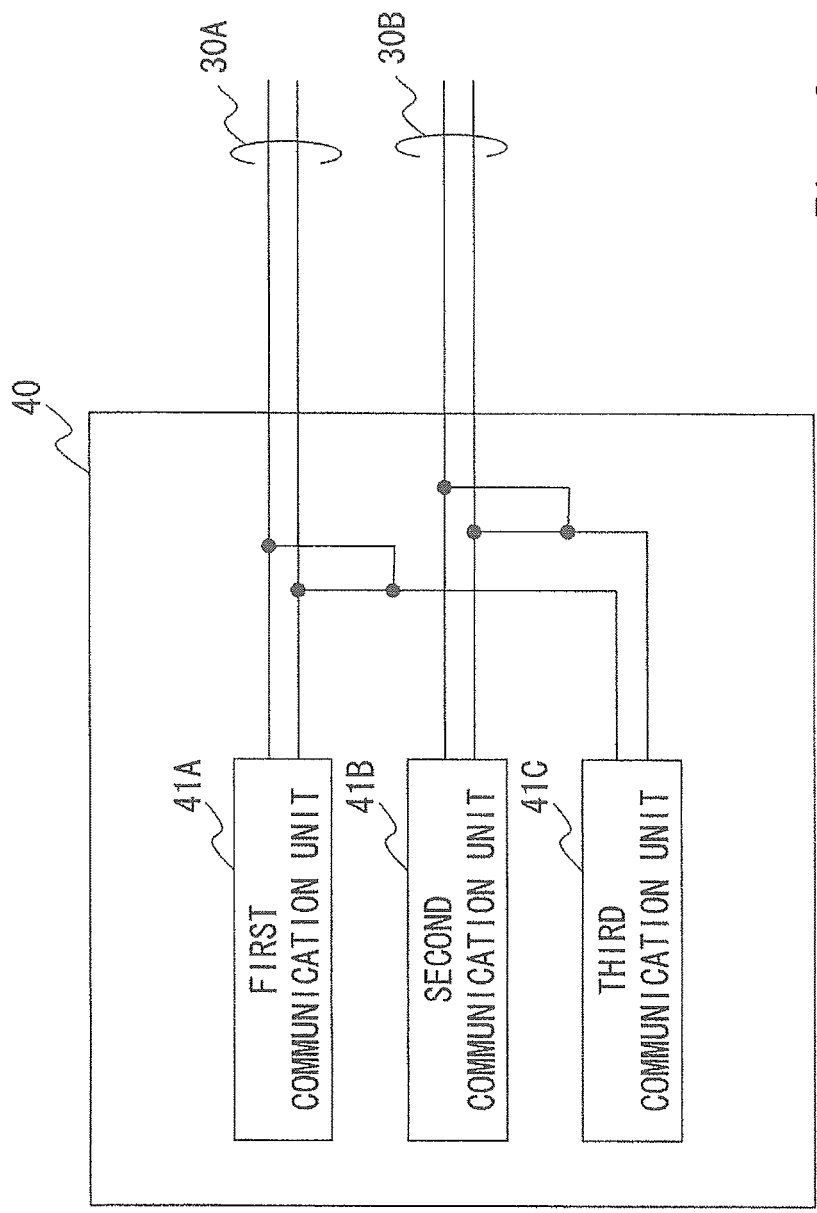

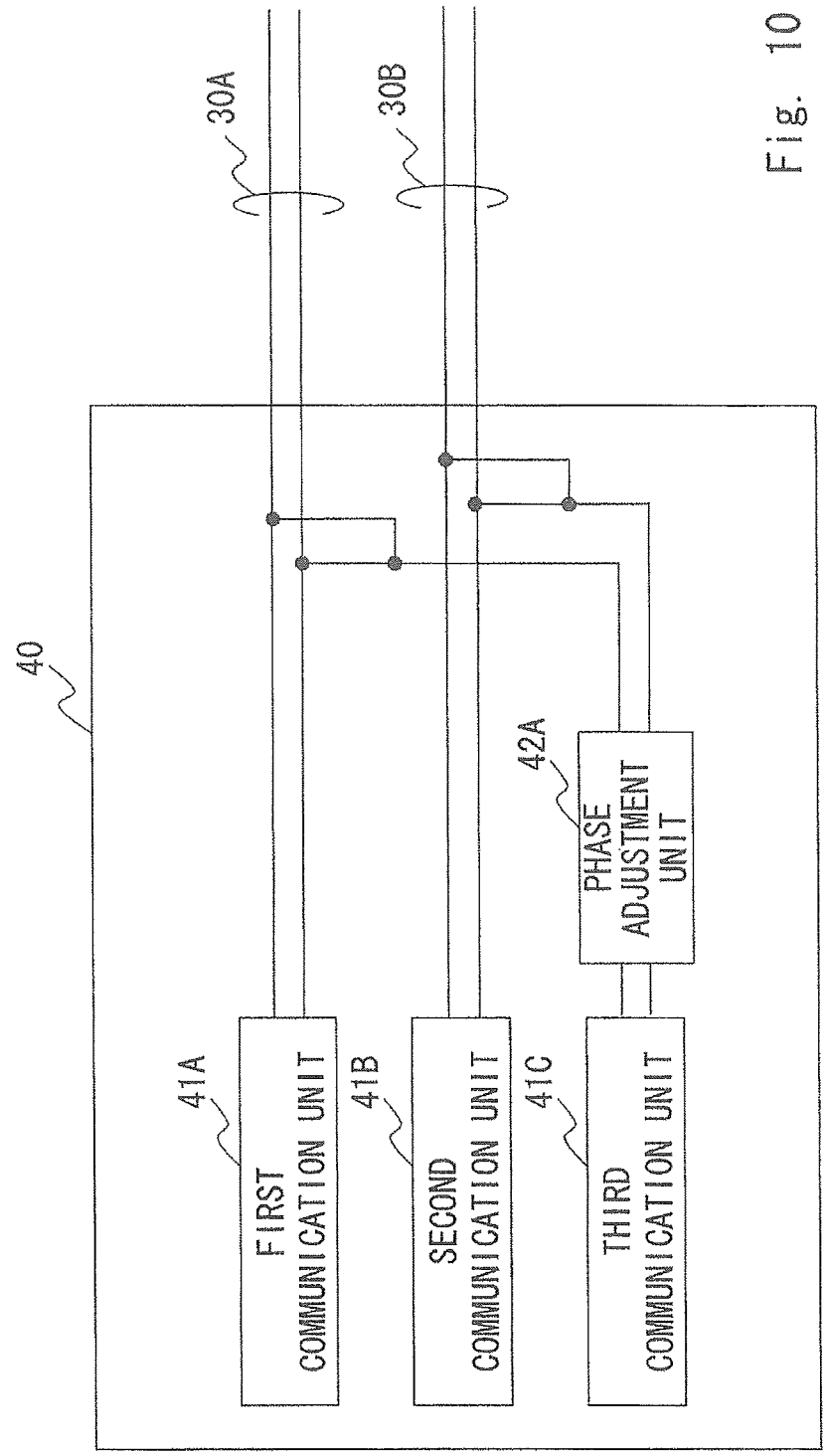

COMMUNICATION APPARATUS, SIGNAL SUPERIMPOSING CIRCUIT, AND METHOD FOR SUPERIMPOSING SIGNALS

TECHNICAL FIELD

The present invention relates to a communication apparatus for transmitting signals using multiple wire pairs, a signal superimposing circuit for superimposing multiple signals, and a method for superimposing signals.

BACKGROUND ART

Inter-apparatus communications conforming to the communication standard 100 BASE-TX or 1000 BASE-T have been widely used. Known methods for controlling an apparatus that performs inter-apparatus communications include disposition of input/output terminals for control and transmission of control signals over main lines.

However, the disposition of input/output terminals for control increases the cost, as well as requires space for disposing the input/output terminals. Further, the transmission of control signals over main lines reduces the capacity of the main lines.

Technologies for solving these problems include a transmission system disclosed in Patent Literature 1. In the transmission system of Patent Literature 1, common-mode signals are transmitted over a Ethernet® pair wire. Thus, control signals are transmitted without having to dispose input/output terminals for control and without reducing the capacity of the main lines. Since this configuration allows common-mode signals to be transmitted over each wire of the twisted pair, the communication capacity can be increased.

CITATION LIST

Patent Literature

[Patent Literature 1] Published Japanese Translation of PCT International Publication for Patent Application, No. 2008-521342

SUMMARY OF INVENTION

Technical Problem

However, in the transmission system of Patent Literature 1, noise around the wires is input to each wire as common mode noise, and thus the transmitted common-mode signals are subject to the noise. Further, since the transmission system of Patent Literature 1 allows common-mode signals to be transmitted over the wires, each wire generates a magnetic field in the same direction, thereby causing spurious emission where each wire acts as an antenna.

The present invention has been made in view of the above problems, and an object thereof is to provide a communication apparatus, signal superimposing circuit, and method for superimposing signals which can transmit signals in such a manner that the signals are not easily subject to noise and that spurious emission is suppressed.

Solution to Problem

A first exemplary aspect of the present invention is a communication apparatus comprising: a first communication unit that transmits differential signals serving as first information over a first wire pair; a second communication unit that transmits differential signals serving as second information over a second wire pair; and a third communication unit that transmits third information by superimposing one of differential signals over the first wire pair and superimposing the other of the differential signals over the second wire pair.

A second exemplary aspect of the present invention is a signal superimposing circuit comprising: a first superimposing circuit that superimposes differential signals and one of different differential signals over a first wire pair, and a second superimposing circuit that superimposes differential signals and the other of the different differential signals over a second wire pair.

A third exemplary aspect of the present invention is a method for superimposing signals, comprising: transmitting first differential signals over a first wire pair; transmitting second differential signals over a second wire pair; and superimposing one of third differential signals over the first wire pair and superimposing the other third differential signal over the second wire pair.

Advantageous Effects of Invention

According to the present invention, it is possible to provide a communication apparatus, signal superimposing circuit, and method for superimposing signals which can transmit signals in such a manner that the signals are not easily subject to noise and that spurious emission is suppressed.

BRIEF DESCRIPTION OF DRAWINGS

FIG. 3 is a conceptual diagram showing an aspect of signal transmission in the transmission system according to the first embodiment.

FIG. 9 is a diagram showing a configuration of the communication apparatus according to the first embodiment.

FIG. 10 is a diagram showing a configuration of a modification of the communication apparatus according to the first embodiment.

DESCRIPTION OF EMBODIMENTS

Figure 1:
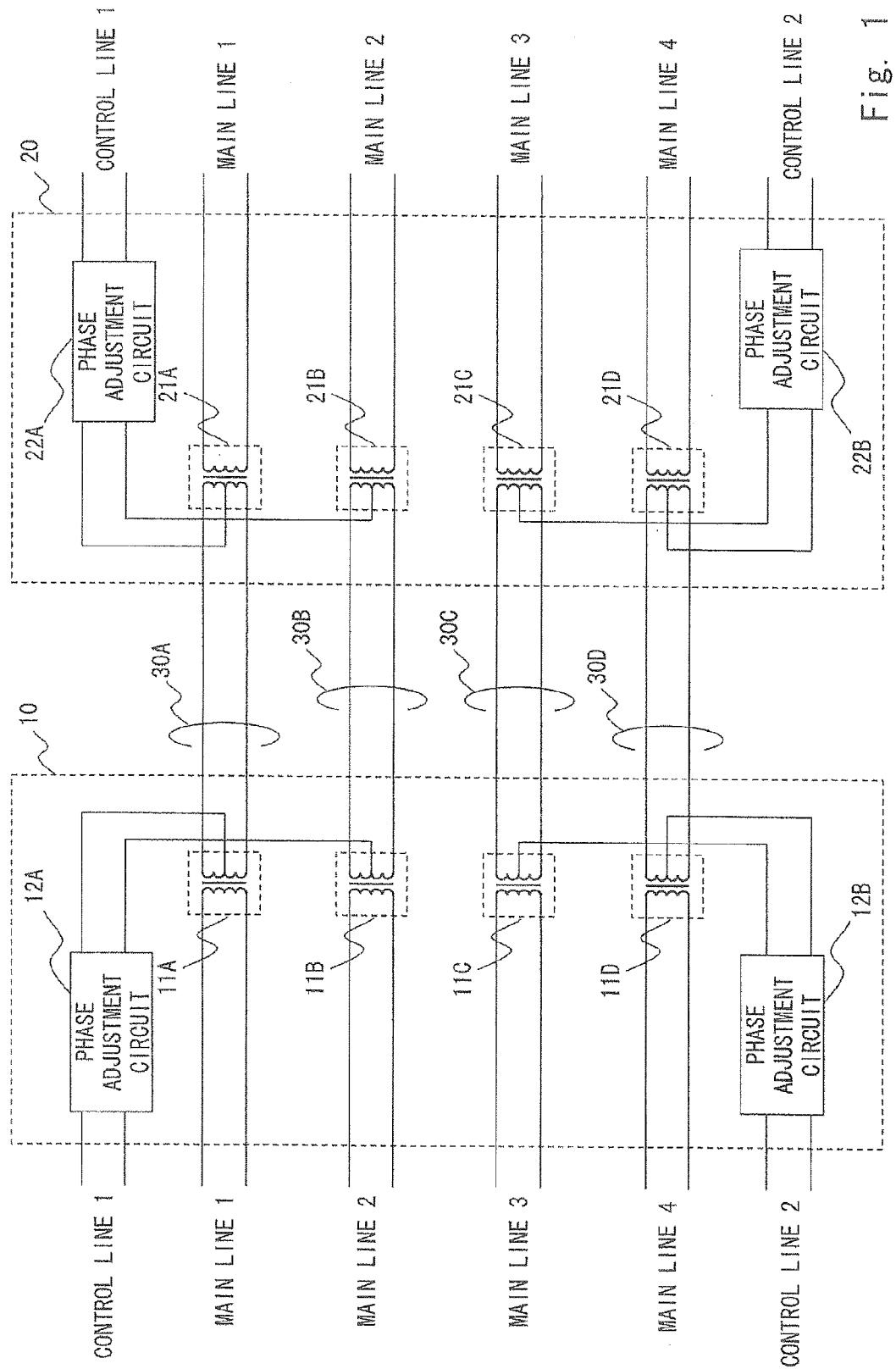
FIG. 1 is a diagram showing a configuration of a transmission system according to a first embodiment.

Now, an embodiment of the present invention will be described with reference to the drawings. While the embodiment of the present invention described below is preferred, the scope of the invention is not limited thereto. In the following description, components having similar reference signs operate in substantially the same manner.
First Embodiment Now, an embodiment of the present invention will be described with reference to the drawings. FIG. 1 is a diagram showing a configuration of a transmission system according to the present invention. In the transmission system according to the present invention, a communication apparatus 10 and a communication apparatus 20 are connected together through four twisted pair wires 30A to 30D. Each twisted pair wire is a wire formed by stranding two transmission wires.

The communication apparatus 10 includes superimposing coils 11A, 11B, 11C, and 11D and phase adjustment circuits 12A and 12B. The communication apparatus 10 outputs signals received from four main lines and two control lines to the twisted pair wires 30A, 30B, 30C, and 30D. The communication apparatus 10 also outputs signals received from the four twisted pair wires 30A, 30B, 30C, and 30D to the four main lines and two control lines.

Similarly, the communication apparatus 20 includes superimposing coils 21A, 21B, 21C, and 21D and phase adjustment circuits 22A and 22B. The communication apparatus 20 outputs signals received from four main lines and two control lines to the twisted pair wires 30A, 30B, 30C, and 30D. The communication apparatus 20 also outputs signals received from the four twisted pair wires 30A, 30B, 30C, and 30D to the four main lines and two control lines.

The phase adjustment circuits 12A and 12B included in the communication apparatus 10 each include two pairs of input/output terminals (four terminals). Each phase adjustment circuit receives differential signals at one pair of terminals and outputs ½-phase-delayed differential signals from the other pair of terminals. That is, the phase adjustment circuits 12A and 12B phase-delay the received differential signals by ½ phase and output the phase-delayed differential signals.

For the phase adjustment circuit 12A, one pair of input/output terminals thereof is connected to the control line 1; one terminal of the other pair of input/output terminals thereof is connected to the superimposing coil 11A; and the other terminal of the other pair of input/output terminals is connected to the superimposing coil 11B. Similarly, for the phase adjustment circuit 12B, one pair of input/output terminals thereof is connected to the control line 2; one terminal of the other pair of input/output terminals is connected to the superimposing coil 11C; and the other terminal of the other pair of input/output terminals is connected to the superimposing coil 11D.

The superimposing coils 11A, 11B, 11C, and 11D included in the communication apparatus 10 each include two pairs of differential input/output terminals (four terminals) and one common-mode input/output terminal. The common-mode input/output terminals of the superimposing coils 11A, 11B, 11C, and 11D are connected to the twisted pair wires 30A, 30B, 30C, and 30D, respectively.

In each superimposing coil, the pairs of differential input/output terminals are insulated from each other. While differential signals pass between the pairs, common-mode signals do not pass therebetween. As used herein, a common-mode signal refers to a signal which is propagated through two transmission paths in the same phase. Each superimposing coil receives differential signals at one pair of differential input/output terminals and outputs the differential signals from the other pair of differential input/output terminals.

When the differential input/output terminals connected to the common-mode input/output terminal receive common-mode signals, the common-mode input/output terminal outputs signals having the same waveform. When the common-mode input/output terminal receives signals, it outputs signals having the same waveform to the differential input/output terminals connected thereto.

Next, the respective operations of the main lines and control lines of the transmission system of the present embodiment will be described and then superimposed signals will be described. While the number of pairs of input differential signals can be any number greater than or equal to three in the present invention, the control line 1 and the main lines 1 and 2 will be selectively described.

Figure 2:
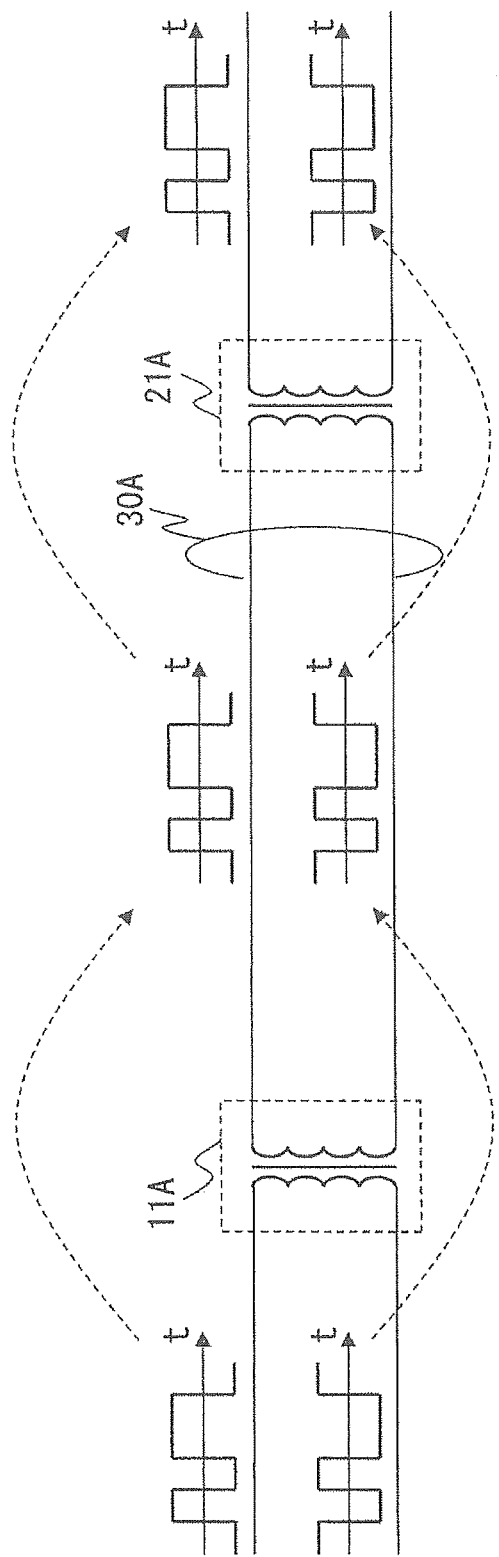
FIG. 2 is a conceptual diagram showing an aspect of signal transmission in the transmission system according to the first embodiment.

First, referring to FIG. 2, main line-to-main line transmission will be described. FIG. 2 shows an aspect where differential signals input to the main line 1 connected to the communication apparatus 10 are output through the twisted pair wire 30A to the main line 1 connected to the communication apparatus 20. Differential signals input from the main line 1 to the communication apparatus 10 are input to the superimposing coil 11A, which then outputs differential signals having the same waveform to the twisted pair wire 30A. The differential signals are input through the twisted pair wire 30A to the communication apparatus 20, which then inputs the differential signals to the superimposing coil 21A, which then outputs differential signals having the same waveform to the main line. Similarly, signals are transmitted from each main line connected to the communication apparatus 20 to each main line connected to the communication apparatus 10.

Next, referring to FIG. 3, control line-to-control line transmission will be described. Differential signals input from the control line 1 to the communication apparatus 10 are input to the phase adjustment circuit 12A and phase-adjusted. The phase adjustment circuit 12A phase-adjusts the input differential signals so that the signals are delayed by ½ phase, outputs one of the phase-adjusted differential signals to the common-mode input/output terminal of the superimposing coil 11A, and outputs the other phase-adjusted differential signal to the common-mode input/output terminal of the superimposing coil 11B.

The signal input from the phase adjustment circuit 12A to the superimposing coil 11A becomes a common-mode signal and is output from the differential input/output terminal adjacent to the common-mode input/output terminal to the twisted pair wire 30A. Similarly, the signal input from the phase adjustment circuit 12A to the superimposing coil 11B becomes a common-mode signal and is output from the differential input/output terminal adjacent to the common-mode input/output terminal to the twisted pair wire 30B. At this time, the common-mode signals having opposite phases pass through the twisted pair wires 30A and 30B. For this reason, magnetic fields generated by the wires are cancelled out, thus suppressing spurious emission based on the common-mode signals.

The common-mode signal which has passed through the twisted pair wire 30A is input to the superimposing coil 21A of the communication apparatus 20. The superimposing coil 21A outputs, as one of differential signals, the input common-mode signal having the same waveform from the common-mode input/output terminal to the phase adjustment circuit 22A. The common-mode signal which has passed through the twisted pair wire 30B is input to the superimposing coil 21B of the communication apparatus 20. The superimposing coil 21B outputs, as the other differential signal, the input common-mode signal having the same waveform from the common-mode input/output terminal to the phase adjustment circuit 22A. In this way, the two common-mode signals, which have been transmitted over the twisted pair wires 30A and 30B and satisfy an opposite phase relationship, are extracted as signals forming differential signals.

The differential signals input from the superimposing coils 21A and 21B to the phase adjustment circuit 22A are delayed by ½ phase and synchronized with differential signals over the main lines, and then output to the control line. In this way, the signals are transmitted from the control line connected to the communication apparatus 10 to the control line connected to the communication apparatus 20. Similarly, signals are transmitted from the control line connected to the communication apparatus 20 to the control line connected to the communication apparatus 10.

Figure 4A:
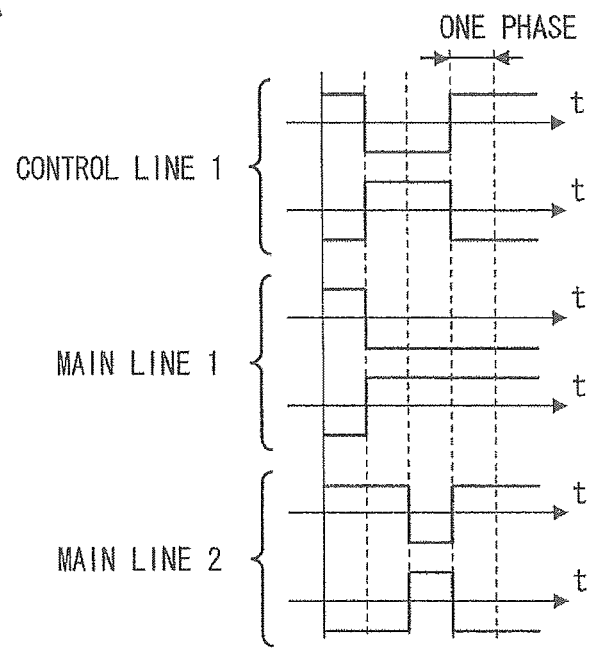
FIG. 4A is a diagram showing an example of the waveforms of signals which have just been input to a communication apparatus 10 in the transmission system according to the first embodiment.
Figure 4B:
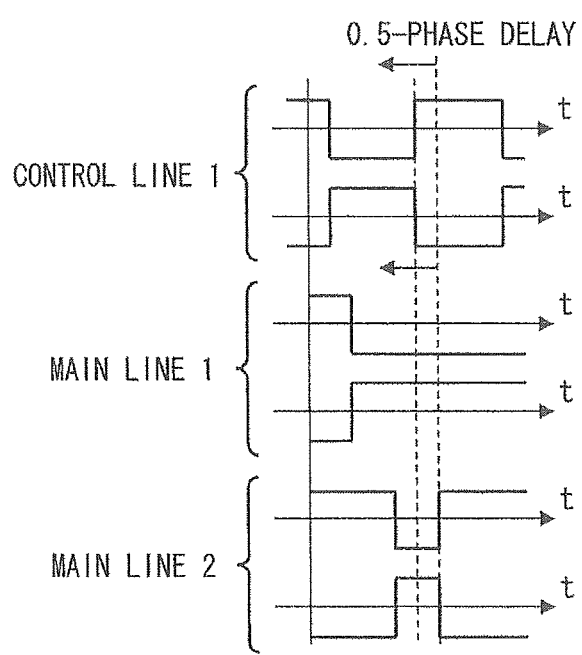
FIG. 4B is a diagram showing an example of the waveforms of signals which have just passed through a phase adjustment circuit 12A in the transmission system according to the first embodiment.
Figure 4C:
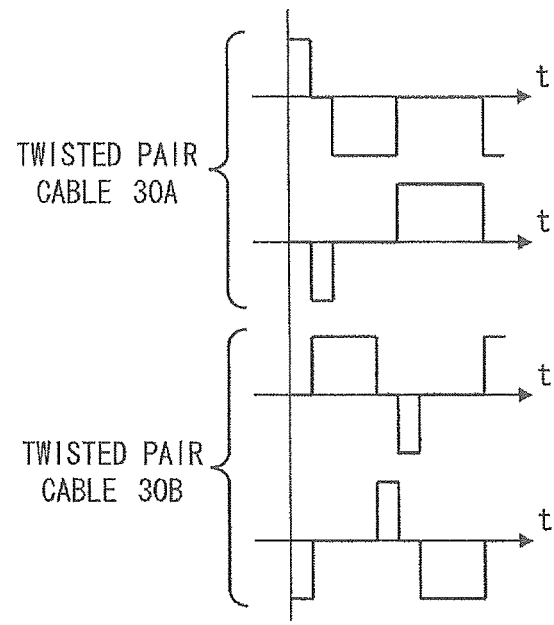
FIG. 4C is a diagram showing an example of the waveforms of signals which are passing through a twisted pair wire in the transmission system according to the first embodiment.
Figure 4D:
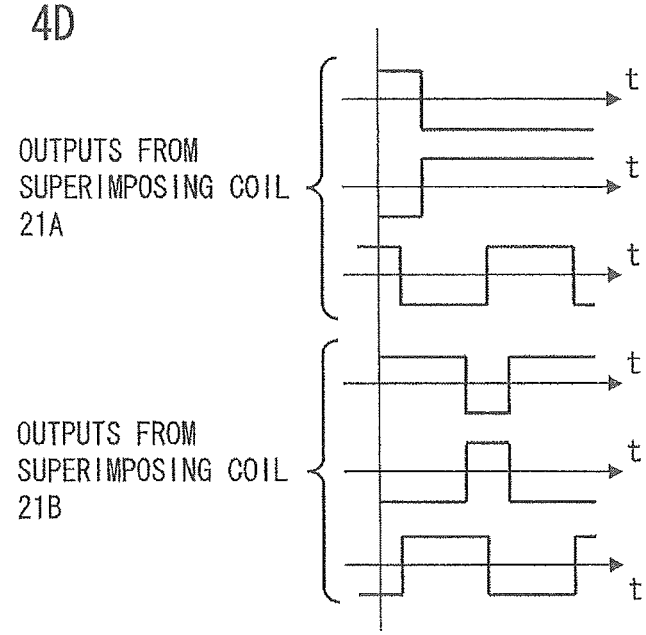
FIG. 4D is a diagram showing an example of the waveforms of signals which have just been output from superimposing coils 21A and 21B in the transmission system according to the first embodiment.
Figure 4E:
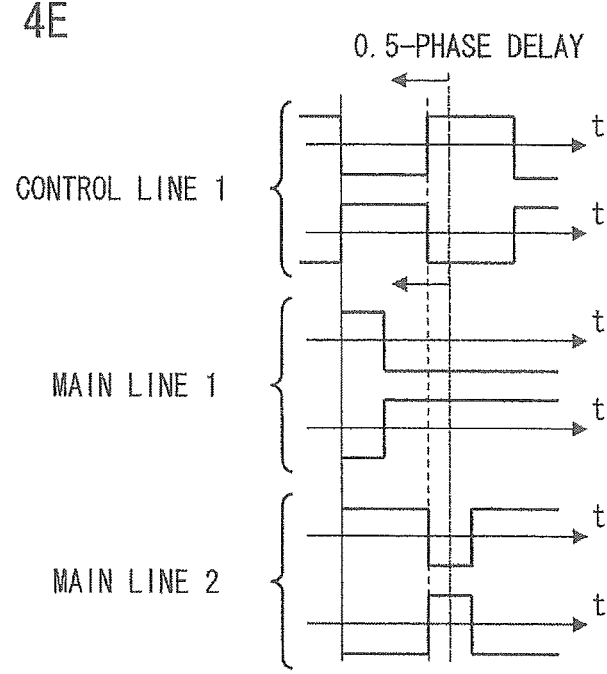
FIG. 4E is a diagram showing an example of the waveforms of signals which have just passed through a phase adjustment circuit 22A in the transmission system according to the first embodiment.

Next, referring to FIGS. 4A to 4E, superimposed signals will be described. FIG. 4A shows the waveforms of signals input from the control line 1 and the main lines 1 and 2 to the communication apparatus 10. The differential signals input from the control line 1 and the main lines 1 and 2 are synchronized with one another. FIG. 4B shows signals which have just passed through the phase adjustment circuit 12A. Since the signals over the control line have a ½-phase-delayed waveform due to the passage of these signals through the phase adjustment circuit 12A, the transition timing of the signals over the control line and the transition timing of the signals over the main lines 1 and 2 are shifted from each other. The necessity for shifting the transition timings of the signals from each other will be described later. FIG. 4C shows the waveforms of signals over the twisted pair wires 30A and 30B which have just passed through the superimposing coils 11A and 11B. At this time, the sum of the vectors of all the waveforms is zero. FIG. 4D shows outputs from the superimposing coils 21A and 21B. At this time, the waveforms of the signals over the respective lines are restored, while the waveforms of the signals over the control line 1 are delayed by ½ phase. FIG. 4E shows outputs from the superimposing coil 22A. Since the phase adjustment circuit 22A delays the signals over the control line 1 by ½ phase, these signals are behind the signals over the main lines 1 and 2 by one phase and synchronized therewith.

Figure 5A:
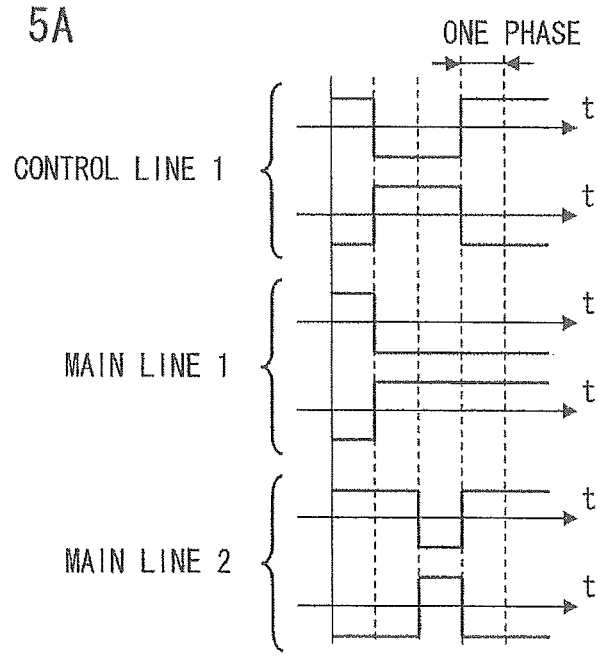
FIG. 5A is a diagram showing another example of the waveforms of signals which have just been input to the communication apparatus 10 in the transmission system according to the first embodiment.
Figure 5B:
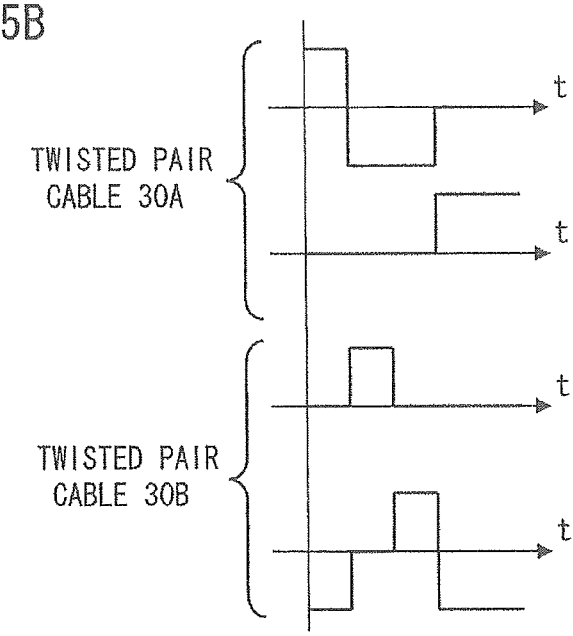
FIG. 5B is a diagram showing another example of the waveforms of signals which are passing through the twisted pair wire in the transmission system according to the first embodiment.
Figure 5C:
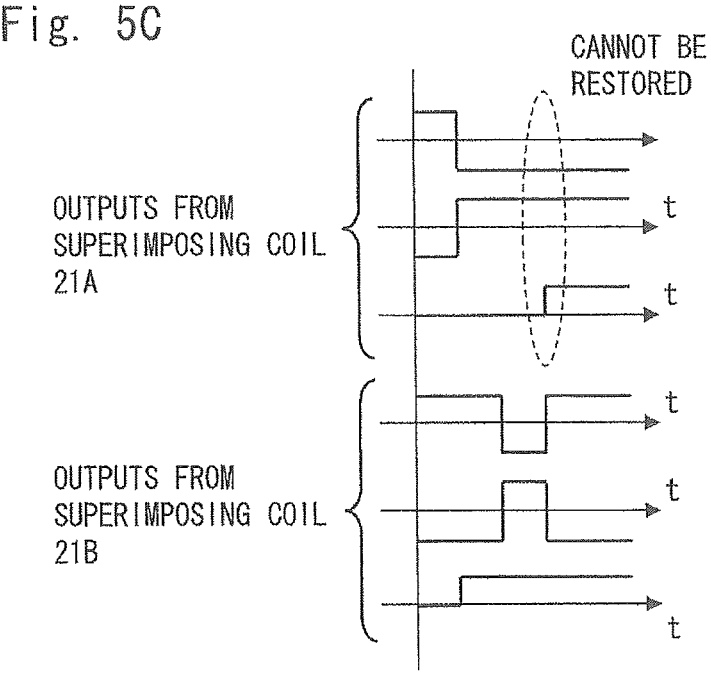
FIG. 5C is a diagram showing another example of the waveforms of signals which have just been output from the superimposing coils 21A and 21B in the transmission system according to the first embodiment.

Next, referring to FIGS. 5A to 5C, the functions of the phase adjustment circuit will be described. FIG. 5A shows the waveforms of the signals input from the control line 1 and the main lines 1 and 2 to the communication apparatus 10. These waveforms are the same as those in FIG. 4A. If the signals having these waveforms are input to the superimposing coils 11A and 11B without passing through the phase adjustment circuit 12A, signals output from the superimposing coils to the twisted pair wires 30A and 30B take waveforms shown in FIG. 5B When the signals having these waveforms are input through the twisted pair wires 30A and 30B to the superimposing coils 21A and 21B, portions which cannot be divided occur in the waveforms of the signals over the main lines and the waveforms of the signals over the control line, as shown in FIG. 5C. As seen above, transmission of signals in synchronization with one another and having similar frequency components requires a mechanism which shifts the transition timings of the differential signals and common-mode signal from each other. For this reason, using the phase adjustment circuit, the transmission side phase-delays the differential signals received from the control line compared to the differential signals received from the main lines and then superimposes the signals. Thus, the receiving side can properly separate the signals.

Figure 6:
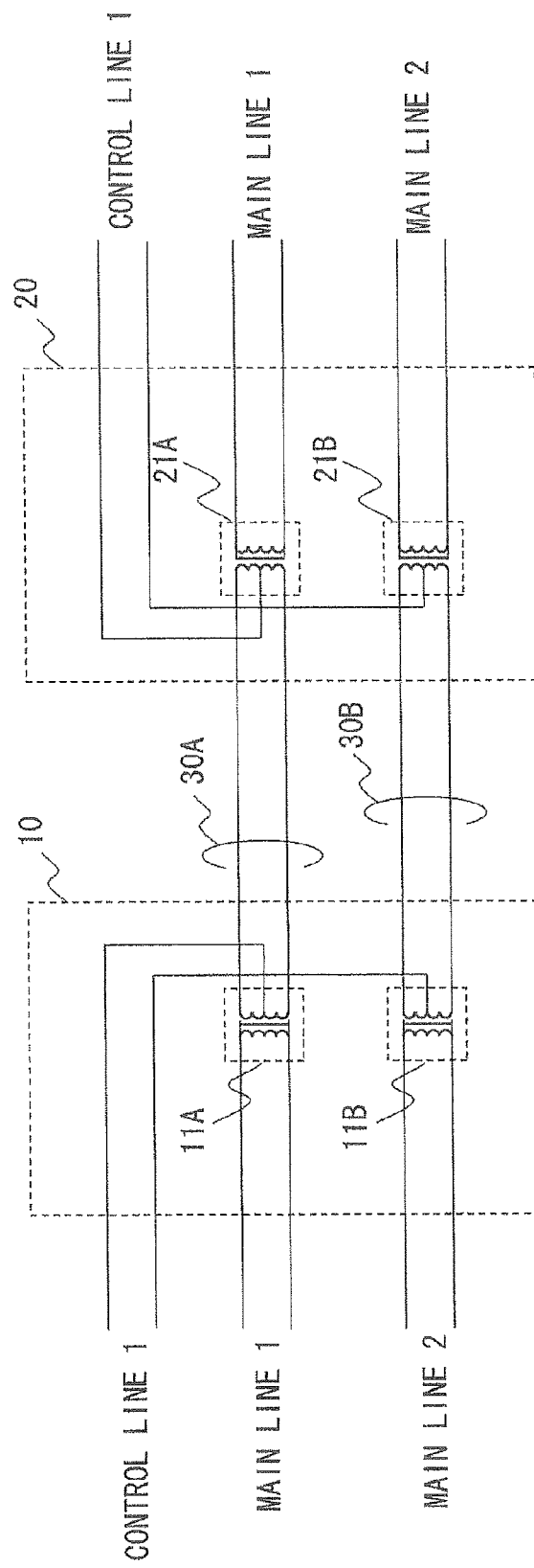
FIG. 6 is a diagram showing a configuration of the transmission system according to the first embodiment of the present invention.

Note that if the signals over the control line are sufficiently slow compared to the signals over the main lines, the superimposing coils can separate the signals. Thus, the phase adjustment circuit becomes unnecessary. In this case, as shown in FIG. 6, the signals can be superimposed without having to phase-adjust the signals using a phase adjustment circuit. Specifically, the superimposing coil 11A serving as a first superimposing circuit superimposes the differential signals received from the main line 1 and one of different differential signals received from the control line over the twisted pair wire 30A serving as a first wire pair. Similarly, the superimposing coil 11B serving as a second superimposing circuit superimposes the differential signals received from the main line 2 and the other different differential signal received from the control line over the twisted pair wire 30B serving as a second wire pair. In this way, the communication apparatus 10 superimposes the signals and transmits the superimposed signals over the twisted pair wires 30A and 30B. In this case, the superimposing coil 11A serving as a first superimposing circuit superimposes the one different differential signal received from the control line so that the signal is transmitted as a common-mode signal over both transmission paths forming the twisted pair wire 30A. Similarly, the superimposing coil 11B serving as a second superimposing circuit superimposes the other different differential signal so that the signal is transmitted as a common-mode signal over both transmission paths forming the twisted pair wire 30B. Accordingly, the sum of the vectors of the four transmission paths forming the twisted pair wires 30A and 30B becomes zero. As a result, magnetic fields generated by the wires can be cancelled out, thereby suppressing spurious emission. Further, the receiving side, communication apparatus 20, can properly separate the common-mode signals and the differential signals. According to the present invention, the above configuration is possible.

As described above, according to the present invention, the communication apparatus, which is configured to transmit differential signals over the wire pairs, superimposes signals having a predetermined phase over a wire pair for transmitting first differential signals and superimposes signals having an opposite phase over a wire pair for transmitting second differential signals. That is, as like in the case of one and the other of differential signals, the signals superimposed over the first wire pair and the signals superimposed over the second wire pair satisfy an opposite phase relationship. According to this configuration, it is possible to suppress spurious radio emission resulting from the transmission of common-mode signals over the transmission paths and to increase the communication capacity without having to increase the number of wires. Further, although the signals input from the control line as differential signals are transmitted over the twisted pair wire as common-mode signals, the signals are extracted as differential signals on the receiving side. Thus, the resistance to noise can be improved. That is, since noise generated by the wires is output from the control line in common mode, it is possible to easily separate and eliminate the noise from the differential signals over the control line. Further, according to this configuration, it is possible to increase the communication capacity without having to tailor the existing wires. As a result, it is possible to reduce the wiring cost for increasing the communication capacity.

While the configuration where the signals are delayed by ½ phase by the phase adjustment circuit 12A on the transmission side and then delayed by another ½ phase by the phase adjustment circuit 22A on the receiving side and thus delayed by a total of one delay has been described, other configurations may be employed. For example, a configuration where the signals are delayed by ¼ phase by the phase adjustment circuit 12A and then delayed by ¾ phase by the phase adjustment circuit 22A and thus delayed by a total of one phase and then separated, may be employed.

Figure 7:
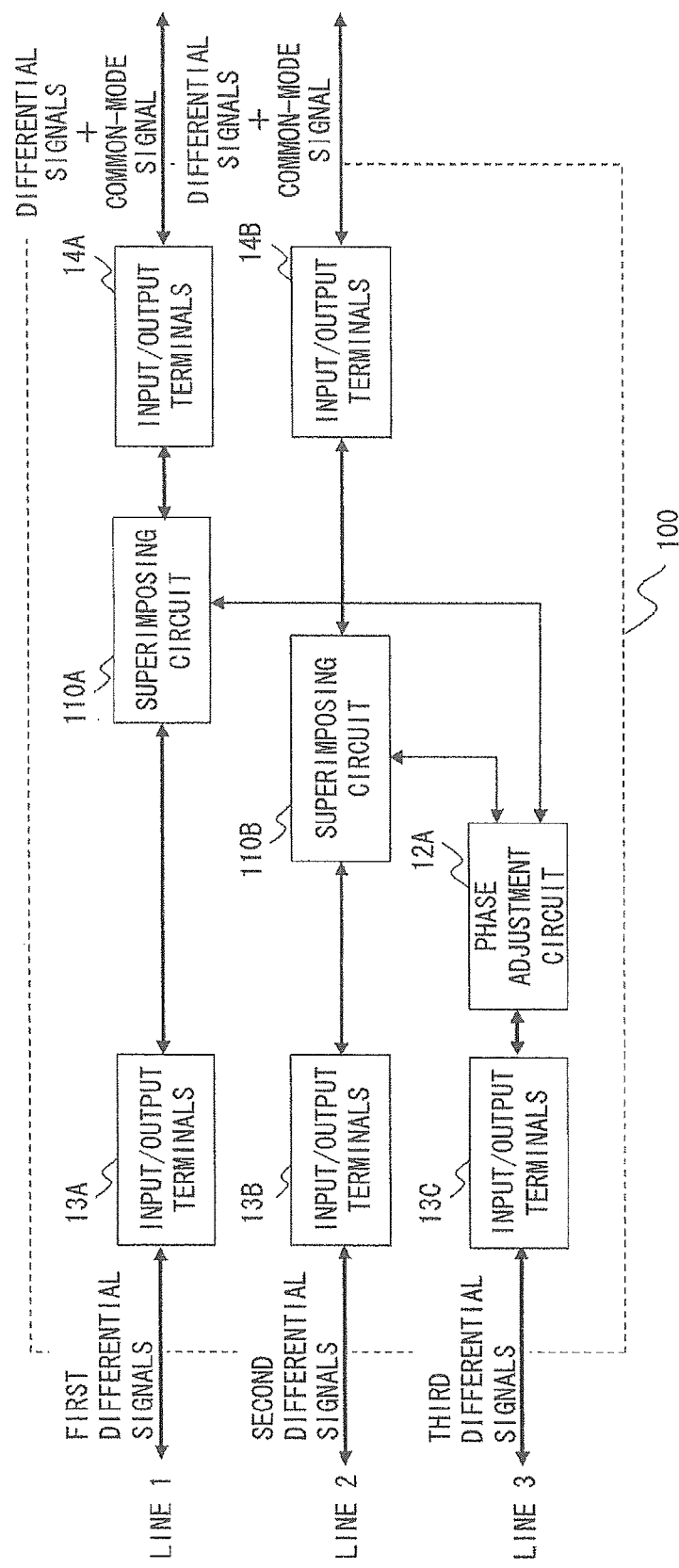
FIG. 7 is a block diagram showing a configuration of a signal superimposing circuit according to the first embodiment.

FIG. 7 is a block diagram of a signal superimposing circuit for superimposing signals in the communication apparatus described above. A signal superimposing circuit 100 includes the phase adjustment circuit 12A, input/output terminals 13A to 13C, input/output terminals 14A and 14B, and superimposing circuits 110A and 110B.

The input/output terminals 13A to 13C receive first to third differential signals from lines 1 to 3, respectively. Each line is a wire pair composed of two transmission paths. The differential signals received by the input/output terminals 13A to 13C are directly output to the superimposing circuits 110A and 110B and the phase adjustment circuit 12A, respectively.

The input/output terminals 13A to 13C also receive differential signals directly from the superimposing circuits 110A and 110B and the phase adjustment circuit 12A, respectively, and output the differential signals directly to the lines 1 to 3.

The phase adjustment circuit 12A phase-delays the differential signals received from the input/output terminals 13C by a predetermined amount of phase, outputs one of the phase-delayed differential signals to the superimposing circuit 110A, and outputs the other phase-delayed differential signal to the superimposing circuit 110B. The signals output to the superimposing circuits 110A and 110B are one and the other of the differential signals which have been received and phase-delayed by the phase adjustment circuit 12A, and therefore satisfy an opposite phase relationship.

The phase adjustment circuit 12A also phase-delays the signal received from the superimposing circuit 110A and the signal received from the superimposing circuit 110B by the same amount of phase and outputs the two phase-delayed signals to the input/output terminals 13C as differential signals. The two signals received from the superimposing circuits 110A and 110B by the phase adjustment circuit 12A satisfy an opposite phase relationship. Accordingly, a combination of the two signals can become differential signals.

The superimposing circuit 110A superimposes the signal received from the phase adjustment circuit 12A on the differential signals received from the input/output terminals 13A and then outputs the superimposed signals to the input/output terminal 14A. That is, the superimposing circuit 110A outputs the differential signals received from the input/output terminals 13A as they are, while it outputs the signal received from the phase adjustment circuit 12A to the transmission paths forming the wire pair as a common-mode signal in such a manner that the signal is in the same phase through the transmission paths. As a result, the superimposing circuit 110A outputs the signals where the common-mode signal is superimposed on the differential signals.

Further, the superimposing circuit 110A splits the signal received from the input/output terminals 14A into in-phase components and differential components, outputs differential signals to the input/output terminals 13A, and outputs common-mode signal components to the phase adjustment circuit 12A.

The superimposing circuit 110B superimposes the signal received from the phase adjustment circuit 12A on the differential signals received from the input/output terminals 13B and then outputs the superimposed signals to the input/output terminal 14B. Accordingly, the superimposing circuit 110B outputs the differential signals received from the input/output terminals 13B, as they are, while it outputs, as a common-mode signal, the signal received from the phase adjustment circuit 12A to the input/output terminals 14B in such a manner that the signal is in the same phase through the transmission paths forming the wire pair. As a result, the superimposing circuit 110B outputs the signals where the common-mode signal is superimposed on the differential signals.

The superimposing circuit 110B also splits the signal received from the input/output terminals 14B into in-phase components and differential components, outputs differential signals to the input/output terminals 13B, and outputs common-mode signal components to the phase adjustment circuit 12A.

The superimposing circuits 110A and 110B correspond to the superimposing coils 11A and 11B, respectively, of FIG. 1. The common-mode signals input to or output from the superimposing circuits 110A and 110B are signals which satisfy an opposite phase relationship, as described above. The common-mode signals are input to the differential input terminals of the superimposing circuit 11A and become differential signals.

The input/output terminals 14A output the signals received from the superimposing circuit 110A to a first twisted pair wire or output the signals received from the twisted pair wire to the superimposing circuit 110A. The input/output terminals 14B output the signals received from the superimposing circuit 110B to a second twisted pair wire or output the signals received from the twisted pair wire to the superimposing circuit 110B. The superimposed differential signals and common-mode signal are transmitted over each twisted pair wire.

Figure 8:
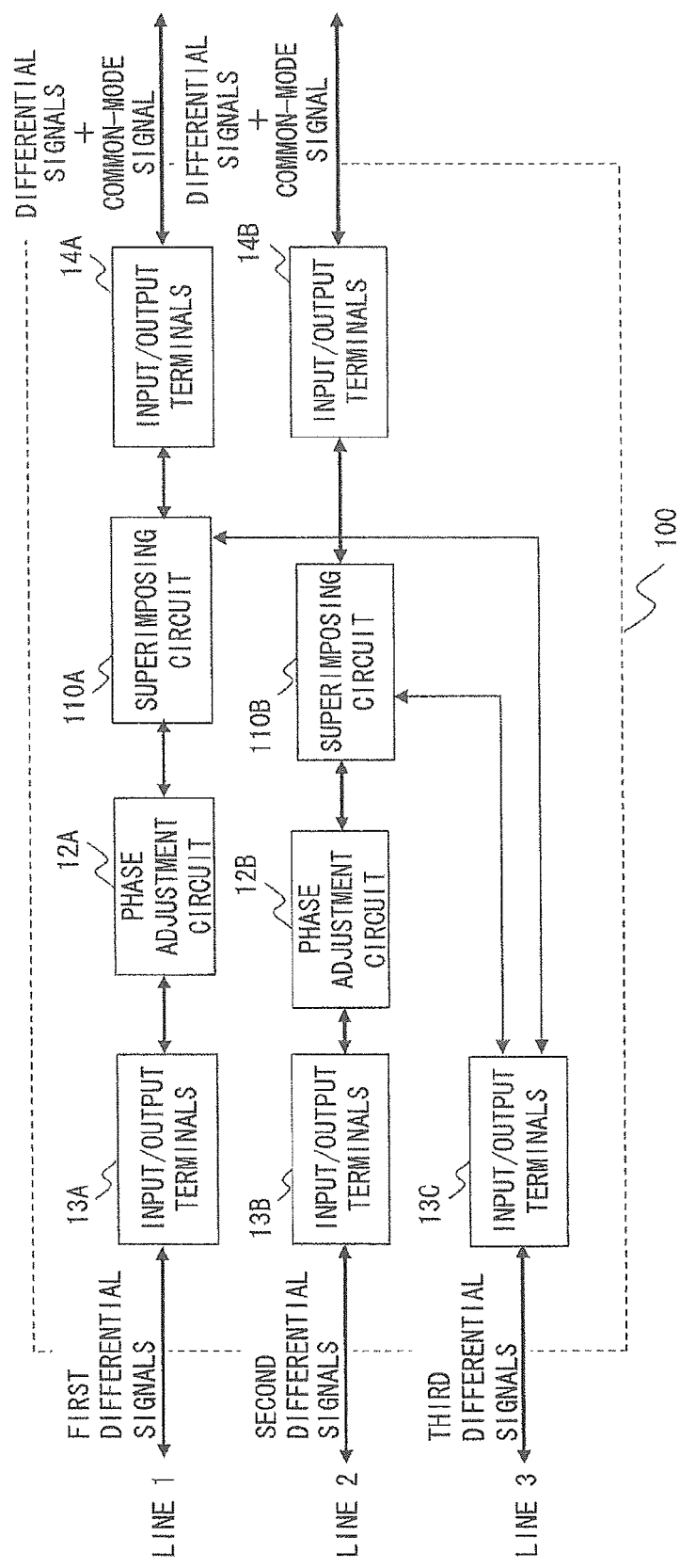
FIG. 8 is a block diagram showing another configuration of the signal superimposing circuit according to the first embodiment.

The signal superimposing circuit 100 may be configured as shown in FIG. 8. In this configuration, phase adjustment circuits 12A and 12B are disposed between the input/output terminals 13A and 13B and the superimposing circuits 110A and 110B, respectively. That is, the phase adjustment circuit 12A phase-delays differential signals received from the input/output terminals 13A by a predetermined amount of phase and outputs the phase-delayed differential signals to the superimposing circuit 110A. Similarly, the phase adjustment circuit 12B phase-delays differential signals received from the input/output terminals 13B by a predetermined amount of phase and outputs the phase-delayed differential signals to the superimposing circuit 110B.

In this configuration also, each superimposing circuit can superimpose the differential signals and the common-mode signal in such a manner as to make a phase difference. Thus, the receiving side can properly separate the signals.

The communication apparatus of the present invention may be configured as shown in FIG. 9. In FIG. 9, a communication apparatus 40 includes a first communication unit 41A, a second communication unit 41B, and a third communication unit 41C.

The first communication unit 41A transmits differential signals serving as first information over the twisted pair wire 30A serving as a first wire pair.

The second communication unit 41B transmits differential signals serving as second information over the twisted pair wire 30B serving as a second wire pair.

The third communication unit 41C transmits third information by superimposing one of differential signals over the twisted pair wire 30A and superimposing the other differential signal over the twisted pair wire 30B.

At this time, the first communication unit 41A transmits the third information by transmitting the one differential signal over the transmission paths forming the twisted pair wire 30A in such a manner that the one differential signal is in the same phase through the transmission paths and transmitting the other differential signal over the transmission paths forming the twisted pair wire 30B in such a manner that the other differential signal is in the same phase through the transmission paths.

The third communication unit 41C transmits the third information at a shifted transmission timing. Specifically, the third communication unit 41C phase-adjusts the signals to be transmitted by a predetermined amount of phase using an internal phase adjustment circuit and then transmits the signals. Accordingly, while the signals to be transmitted from the first communication unit 41A and the signals to be transmitted from the second communication unit 41B are transmitted at the same timing, the signals to be transmitted from the third communication unit 41C are transmitted at the shifted transmission timing. As a result, the receiving-side communication apparatus can properly separate the signals.

As shown in FIG. 10, a phase adjustment unit 42 for phase-adjusting signals to be transmitted may be disposed outside the third communication unit 41C.

While the configuration where six pairs of differential signals are received from the four main lines and two control lines have been described, other configurations may be employed. The number of pairs of differential signals received by the communication apparatus of the present invention may be any number greater than or equal to three.

The present invention is not limited to the above embodiment, and changes can be made to the embodiment as appropriate without departing from the spirit and scope of the invention. For example, the following configuration is possible.

(1) A communication apparatus comprising: first communication means for transmitting differential signals serving as first information over a first wire pair; second communication means for transmitting differential signals serving as second information over a second wire pair; and third communication means for transmitting third information by superimposing one of differential signals over the first wire pair and superimposing the other of the differential signals over the second wire pair.

(2) The communication apparatus according to (2), wherein the third communication means transmits the third information in common mode by superimposing the one differential signal in such a manner that the one differential signal is in the same phase through both transmission paths forming the first wire pair and superimposing the other differential signal in such a manner that the other differential signal is in the same phase through both transmission paths forming the second wire pair.

(3) The communication apparatus according to (1) or (2), wherein the first communication means receives differential signals serving as fourth information transmitted over the first wire pair, the second communication means receives differential signals serving as fifth information transmitted over the second wire pair, and the third communication means receives sixth information by receiving one of differential signals transmitted over the first wire pair and the other of the differential signals transmitted over the second wire pair.

(4) A signal superimposing circuit comprising: a first superimposing circuit that superimposes differential signals and one of different differential signals over a first wire pair, and a second superimposing circuit that superimposes differential signals and the other of the different differential signals over a second wire pair.

(5) The signal superimposing circuit according to (4), wherein the first superimposing circuit superimposes the one different differential signal in such a manner that the one different differential signal is in the same phase through both transmission paths forming the first wire pair, and the second superimposing circuit superimposes the other different differential signal in such a manner that the other different differential signal is in the same phase through both transmission paths forming the second wire pair.

(6) The signal superimposing circuit according to (4) or (5), further comprising: first input means for receiving first differential signals; second input means for receiving second differential signals; and third input means for receiving third differential signals, wherein the first superimposing circuit superimposes the first differential signals received by the first input means and one of the third differential signals received by the third input means over the first wire pair, and the second superimposing circuit superimposes the second differential signals received by the second input means and the other third differential signal over the second wire pair.

(7) The signal superimposing circuit according to (6), further comprising a phase delay circuit configured to delay phases of the third differential signals, wherein the first superimposing circuit superimposes one of the third differential signals phase-delayed by the phase delay circuit over the first wire pair, and the second superimposing circuit superimposes the other third differential signal phase-delayed by the phase adjustment circuit over the second wire pair.

(8) The signal superimposing circuit according to any one of (4) to (7), wherein the first and second superimposing circuits superimpose signals so that a sum of vectors of the signals passing through the first and second wire pairs is zero.

(9) A method for superimposing signals, comprising: transmitting first differential signals over a first wire pair; transmitting second differential signals over a second wire pair; and transmitting one of third differential signals over the first wire pair and transmitting the other third differential signal over the second wire pair.

(10) The signal superimposing circuit according to (6), wherein the first superimposing circuit splits a signal received from the first wire pair into differential signal components and common-mode signal components, outputs the differential signal components to the first input unit, and outputs the common-mode signal components to the third input unit, the second superimposing circuit splits a signal received from the second wire pair into differential signal components and common-mode signal components, outputs the differential signal components to the second input unit, and outputs the common-mode signal components to the third input unit, the first input unit outputs the differential signal received from the first superimposing circuit as fourth differential signals, the second input unit outputs the differential signal components received from the second superimposing circuit as fifth differential signals, and the third input unit superimposes the common-mode signal components received from the first superimposing circuit and the common-mode signal components received from the second superimposing circuit and outputs the superimposed signals as sixth differential signals.

While the invention of the present application has been described with reference to the embodiment, the invention is not limited thereto. Various changes understandable for those skilled in the art can be made to the configuration or details of the invention of the present application without departing from the scope of the invention.

The present application claims priority based on Japanese Patent Application No. 2011-181854, filed on Aug. 23, 2011, the disclosure of which is incorporated herein in its entirety.

REFERENCE SIGNS LIST

10: communication apparatus
11A to 11D: superimposing coil
12A, 12B: phase adjustment circuit
13A to 13C: input/output terminals
14A, 14B: input/output terminals
20: communication apparatus
21A to 21D: superimposing coil
22A, 22B: phase adjustment circuit
30A to 30D: twisted pair wire
40: communication apparatus
41A to 41C: communication unit
42: phase adjustment unit
100: signal superimposing circuit
100A, 110B: superimposing circuit

The invention claimed is:

1. A communication apparatus comprising:
a first communication unit that transmits differential signals serving as first information over a first wire pair;
a second communication unit that transmits differential signals serving as second information over a second wire pair; and
a third communication unit that transmits third information by superimposing one of the differential signals over the first wire pair and superimposing another of the differential signals over the second wire pair,
wherein the third communication unit shifts a transition timing of the one of the differential signals and the differential signals serving as first information and shifts a transition timing of the other of the differential signals and the differential signals serving as second information.

2. The communication apparatus according to claim 1, wherein the third communication unit transmits the third information in a common mode by superimposing the one differential signal in such a manner that the one differential signal is in a same phase through both transmission paths forming the first wire pair and superimposing the other differential signal in such a manner that the other differential signal is in a same phase through both transmission paths forming the second wire pair.

3. The communication apparatus according to claim 1, wherein:
the first communication unit receives differential signals serving as fourth information transmitted over the first wire pair,
the second communication unit receives differential signals serving as fifth information transmitted over the second wire pair, and
the third communication unit receives sixth information by receiving one of differential signals transmitted over the first wire pair and the other of the differential signals transmitted over the second wire pair.

4. The communication apparatus according to claim 1, wherein at least one of the signals superimposed by said third communication unit comprises a common-mode signal.

5. The communication apparatus according to claim 1, wherein a transition timing of a common-mode signal is shifted from the transition timing of the one of the differential signals and the differential signals serving as the first information.

6. The communication apparatus according to claim 1, wherein a transition timing of a common-mode signal is shifted from the other of the differential signals and the differential signals serving as the second information.

7. The communication apparatus according to claim 1, wherein the differential signal superimposed over the first wire pair and the differential signal superimposed over the second wire pair satisfy an opposite phase relationship.

8. A signal superimposing circuit comprising:
a first superimposing circuit that superimposes differential signals and one of different differential signals over a first wire pair, and
a second superimposing circuit that superimposes differential signals and another of the different differential signals over a second wire pair,
wherein a transition timing of the differential signals and the one of different differential signals over the first wire pair is shifted and a transition timing of the differential signals and the other of the different differential signals over the second wire pair is shifted.

9. The signal superimposing circuit according to claim 8, wherein:
the first superimposing circuit superimposes the one different differential signal in such a manner that the one different differential signal is in a same phase through both transmission paths forming the first wire pair, and
the second superimposing circuit superimposes the other different differential signal in such a manner that the other different differential signal is in a same phase through both transmission paths forming the second wire pair.

10. The signal superimposing circuit according to claim 8, further comprising:
a first input unit that receives first differential signals;
a second input unit that receives second differential signals; and
a third input unit that receives third differential signals,
wherein:
the first superimposing circuit superimposes the first differential signals received by the first input unit and one of the third differential signals received by the third input unit over the first wire pair, and
the second superimposing circuit superimposes the second differential signals received by the second input unit and another third differential signal over the second wire pair.

11. The signal superimposing circuit according to claim 10, further comprising
a phase adjustment circuit that delays phases of the third differential signals,
wherein:
the first superimposing circuit superimposes one of the third differential signals phase-delayed by the phase adjustment circuit over the first wire pair, and
the second superimposing circuit superimposes the other third differential signal phase-delayed by the phase adjustment circuit over the second wire pair.

12. The signal superimposing circuit according to claim 8, wherein the first and second superimposing circuits superimpose signals so that a sum of vectors of the signals passing through the first and second wire pairs is zero.

13. The signal superimposing circuit according to claim 10, wherein:
the first superimposing circuit splits a signal received from the first wire pair into differential signal components and common-mode signal components, outputs the differential signal components to the first input unit, and outputs the common-mode signal components to the third input unit,
the second superimposing circuit splits a signal received from the second wire pair into differential signal components and common-mode signal components, outputs the differential signal components to the second input unit, and outputs the common-mode signal components to the third input unit,
the first input unit outputs the differential signal received from the first superimposing circuit as fourth differential signals,
the second input unit outputs the differential signal components received from the second superimposing circuit as fifth differential signals, and
the third input unit superimposes the common-mode signal components received from the first superimposing circuit and the common-mode signal components received from the second superimposing circuit and outputs the superimposed signals as sixth differential signals.

14. A method for superimposing signals, comprising:
transmitting first differential signals over a first wire pair;
transmitting second differential signals over a second wire pair; and
superimposing one of third differential signals over the first wire pair and superimposing another third differential signal over the second wire pair,
wherein a transition timing of the first differential signals and the one of the third differential signals over the first wire pair is shifted and a transition timing of the second differential signals and the other third differential signal over the second wire pair is shifted.

* * * * *